US011303509B2

(12) United States Patent
Brooker et al.

(10) Patent No.: US 11,303,509 B2
(45) Date of Patent: *Apr. 12, 2022

(54) RESOURCE ALLOCATION TO REDUCE CORRELATED FAILURES

(71) Applicant: Amazon Technologies, Inc., Seattle, WA (US)

(72) Inventors: Marc J. Brooker, Cape Town (ZA); Cornelle Christiaan Pretorius Janse Van Rensburg, Cape Town (ZA); Abhinav Agrawal, Seattle, WA (US); Adam D. Gray, Seattle, WA (US); Marvin M. Theimer, Bellevue, WA (US); Peter N. DeSantis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/665,019

(22) Filed: Jul. 31, 2017

(65) Prior Publication Data

US 2017/0331683 A1 Nov. 16, 2017

Related U.S. Application Data

(63) Continuation of application No. 13/243,858, filed on Sep. 23, 2011, now Pat. No. 9,722,866.

(51) Int. Cl.
*H04L 12/24* (2006.01)
*G06F 11/00* (2006.01)
(Continued)

(52) U.S. Cl.
CPC ........ *H04L 41/0806* (2013.01); *G06F 9/5077* (2013.01); *G06F 11/004* (2013.01)

(58) Field of Classification Search
CPC .................................................. H04L 41/0806
See application file for complete search history.

(56) References Cited

U.S. PATENT DOCUMENTS

| 5,996,013 A | 11/1999 | Delp et al. |
| 6,212,389 B1 | 4/2001 | Fapojuwo et al. |

(Continued)

FOREIGN PATENT DOCUMENTS

| CN | 1771479 | 5/2006 |
| JP | 2002024192 | 1/2002 |

(Continued)

OTHER PUBLICATIONS

AU2011314183, "Patent Examination Report No. 1," dated Apr. 9, 2014, 4 pages.

(Continued)

*Primary Examiner* — Nicholas P Celani
(74) *Attorney, Agent, or Firm* — Davis Wright Tremaine LLP

(57) ABSTRACT

Implementation resources are operated in a manner furthering a particular purpose while excluding use of the implementation resources for other purposes. At least some of the implementation resources have capacity that is usable to implement multiple other resources. The capacity of the implementation resources is allocated in a manner that satisfies one or more conditions on the capacity of the implementation resources that is used. Generally, the capacity is allocated in a manner that reduces the likelihood that resources initiated close in time will fail together should underlying implementation resources fail. The implementation resources may be hardware devices that implement virtual computer systems.

16 Claims, 8 Drawing Sheets

(51) Int. Cl.
*G06F 9/50* (2006.01)
*H04L 41/0806* (2022.01)

(56) References Cited

U.S. PATENT DOCUMENTS

| | | | |
|---|---|---|---|
| 6,968,323 | B1 | 11/2005 | Bansal et al. |
| 7,433,311 | B1 | 10/2008 | Kalyanasundaram et al. |
| 7,522,036 | B1 | 4/2009 | Preuss et al. |
| 7,610,225 | B2 | 10/2009 | O'Neill |
| 8,473,615 | B1 | 6/2013 | Rowland et al. |
| 8,484,355 | B1 | 7/2013 | Lochhead et al. |
| 8,843,624 | B2 | 9/2014 | Hirsch et al. |
| 8,924,982 | B2 | 12/2014 | Brandwine et al. |
| 2002/0156828 | A1 | 10/2002 | Ishizaki et al. |
| 2004/0221038 | A1 | 11/2004 | Clarke, Jr. et al. |
| 2005/0131993 | A1 | 6/2005 | Fatula |
| 2006/0075079 | A1 | 4/2006 | Powers et al. |
| 2006/0143495 | A1 | 6/2006 | Bozak et al. |
| 2006/0190602 | A1 | 8/2006 | Canali et al. |
| 2006/0212334 | A1 | 9/2006 | Jackson |
| 2007/0067435 | A1 | 3/2007 | Landis et al. |
| 2007/0088703 | A1* | 4/2007 | Kasiolas ............... G06F 3/0605 |
| 2007/0105574 | A1 | 5/2007 | Gupta et al. |
| 2007/0105575 | A1 | 5/2007 | Sampath et al. |
| 2007/0105576 | A1 | 5/2007 | Gupta et al. |
| 2007/0201361 | A1 | 8/2007 | Kumar et al. |
| 2007/0271560 | A1* | 11/2007 | Wahlert ..................... G06F 8/61 718/1 |
| 2008/0021988 | A1* | 1/2008 | Abernethy .......... H04L 67/1008 709/223 |
| 2008/0126547 | A1 | 5/2008 | Waldspurger |
| 2008/0201711 | A1 | 8/2008 | Amir Husain |
| 2008/0216082 | A1 | 9/2008 | Eilam et al. |
| 2008/0222352 | A1 | 9/2008 | Booth et al. |
| 2008/0285436 | A1 | 11/2008 | Robinson |
| 2008/0320242 | A1 | 12/2008 | Jelinek et al. |
| 2009/0019535 | A1 | 1/2009 | Mishra et al. |
| 2009/0157870 | A1 | 6/2009 | Nakadai |
| 2009/0164356 | A1 | 6/2009 | Bakman |
| 2009/0204961 | A1 | 8/2009 | DeHaan et al. |
| 2009/0271324 | A1 | 10/2009 | Jandhyala et al. |
| 2009/0271472 | A1 | 10/2009 | Scheifler et al. |
| 2009/0276771 | A1 | 11/2009 | Nickolov et al. |
| 2010/0005465 | A1 | 1/2010 | Kawato |
| 2010/0036957 | A1 | 2/2010 | Patel et al. |
| 2010/0058342 | A1* | 3/2010 | Machida ............... G06F 9/5077 718/1 |
| 2010/0070560 | A1* | 3/2010 | Hale ..................... G06F 9/5055 709/203 |
| 2010/0144363 | A1 | 6/2010 | De Rosa et al. |
| 2010/0169490 | A1 | 7/2010 | McNair |
| 2010/0185596 | A1 | 7/2010 | Dee |
| 2010/0186010 | A1 | 7/2010 | Chalemin et al. |
| 2010/0192212 | A1 | 7/2010 | Raleigh |
| 2010/0223364 | A1 | 9/2010 | Wei |
| 2010/0223383 | A1 | 9/2010 | Salevan et al. |
| 2010/0250744 | A1 | 9/2010 | Hadad et al. |
| 2010/0293269 | A1 | 11/2010 | Wilson et al. |
| 2010/0299495 | A1 | 11/2010 | Frank et al. |
| 2010/0306773 | A1 | 12/2010 | Lee et al. |
| 2010/0332658 | A1* | 12/2010 | Elyashev ................ G06F 9/505 709/226 |
| 2011/0055034 | A1 | 3/2011 | Ferris et al. |
| 2011/0119104 | A1 | 5/2011 | Levine et al. |
| 2011/0145412 | A1 | 6/2011 | Ford et al. |
| 2011/0173637 | A1 | 7/2011 | Brandwine et al. |
| 2011/0252420 | A1 | 10/2011 | Tung et al. |
| 2011/0295727 | A1 | 12/2011 | Ferris et al. |
| 2011/0296422 | A1* | 12/2011 | Hildebrand ......... G06F 16/1824 718/102 |
| 2011/0310757 | A1 | 12/2011 | Yokoyama et al. |
| 2012/0084113 | A1 | 4/2012 | Brandwine et al. |
| 2012/0084443 | A1 | 4/2012 | Theimer et al. |
| 2013/0031559 | A1 | 1/2013 | Alicherry |

FOREIGN PATENT DOCUMENTS

| | | |
|---|---|---|
| JP | 2003124976 | 4/2003 |
| JP | 2004503011 | 1/2004 |
| JP | 2005234637 | 9/2005 |
| JP | 2007526558 | 9/2005 |
| JP | 2009110347 | 5/2009 |
| JP | 2009134640 | 6/2009 |
| JP | 2010205209 | 9/2010 |
| WO | WO2009108344 | 9/2009 |
| WO | WO2012050772 | 4/2012 |

OTHER PUBLICATIONS

AU2014265092, "First Exam Report," dated Feb. 26, 2016, 2 pages.
CA2811020, "Office Action," dated Dec. 2, 2016, 3 pages.
CA2811020 "Office Action," dated Jan. 28, 2016, 3 pages.
CA2811020, "Office Action," dated Mar. 20, 2015, 4 pages.
CN201180047381, "Notice of Grant," dated Feb. 23, 2016, 4 pages.
CN201180047381, "Office Action," dated Aug. 11, 2015, 25 pages.
CN201180047381, "Office Action," dated Jan. 7, 2015, 13 pages.
JP2013529433, "Notice of Allowance," dated Jan. 27, 2015, 6 pages.
JP2013529433, "Official Notice of Rejection," dated Sep. 24, 2014, with English translation, 4 pages.
JP2015036886, "Notice of Rejection," dated Apr. 22, 2014, 6 pages.
JP2015036886, "Official Notice of Allowance," dated May 10, 2016, 6 pages.
JP2015036886, "Office Action," dated Feb. 22, 2016, 8 pages.
SG201301717-3, "Examination Report," dated Nov. 17, 2014, 5 pages.
SG201301717-3, "Invitation to Respond to Written Opinion with Written Opinion," dated Oct. 29, 2013, 9 pages.
SG10201508046Q, "Search Report and Written Opinion," dated Apr. 25, 2017, 8 pages.
PCT/US2011/052592, "International Search Report and Written Opinion", filed Sep. 21, 2011, 15 pages.
Non-Final Office Action dated Aug. 30, 2012, in U.S. Appl. No. 12/894,883, filed Feb. 14, 2013.
Non-Final Office Action dated Jul. 16, 2012, in U.S. Appl. No. 13/045,200, filed Nov. 15, 2011.
Final Office Action dated Feb. 8, 2013, in U.S. Appl. No. 13/045,200, filed Apr. 5, 2013.
CA2811020, Office Action, dated Oct. 30, 2017, 4 pages.
SG10201508046, Examination Report, dated Nov. 16, 2017, 4 pages.
EP11832978.8, Extended European Search Report, dated Dec. 20, 2017, 10 pages.
Greene, "Virtualization: Transforming the IT Landscape," 2006, 22 pages.
Vmware, "VMware Infrastructure: Resource Management with VMware DRS", Revision 20061122 Version: 1.1 Item: Item: VI-ENG-Q206-238, 24 pages.

* cited by examiner

Implementation Resource

| RAU 1 | RAU 2 | RAU 3 | RAU 4 | RAU 5 | RAU 6 |
|---|---|---|---|---|---|

*Figure 3*

| IR 1 | | | | | |
|---|---|---|---|---|---|
| 1 | 5 | 9 | 13 | 17 | 22 |

| IR 2 | | | | | |
|---|---|---|---|---|---|
| 2 | 6 | 10 | 14 | 18 | 23 |

| IR 3 | | | | | |
|---|---|---|---|---|---|
| 3 | 7 | 11 | 15 | 19 | 24 |

| IR 4 | | | | | |
|---|---|---|---|---|---|
| 4 | 8 | 12 | 16 | 21 | 27 |

| IR 5 | | | | | |
|---|---|---|---|---|---|
| *20* | 26 | 30 | 33 | | |

| IR 6 | | | | | |
|---|---|---|---|---|---|
| *25* | 28 | 31 | | | |

| IR 7 | | | | | |
|---|---|---|---|---|---|
| *29* | 32 | | | | |

| IR 8 | | | | | |
|---|---|---|---|---|---|
| *34* | | | | | |

| IR 9 | | | | | |
|---|---|---|---|---|---|
| | | | | | |

Initial IR Basis.: 4
Target Utilization Ratio: 0.8

*n* — New IR for nth used RAU

☐ Unused RAU     n Used RAU

| Used RAU | Used IR | Utilization Ratio |
|---|---|---|
| 1 | 4 | 0.042 |
| 2 | 4 | 0.083 |
| 3 | 4 | 0.125 |
| 4 | 4 | 0.167 |
| 5 | 4 | 0.208 |
| 6 | 4 | 0.25 |
| 7 | 4 | 0.292 |
| 8 | 4 | 0.333 |
| 9 | 4 | 0.375 |
| 10 | 4 | 0.417 |
| 11 | 4 | 0.458 |
| 12 | 4 | 0.5 |
| 13 | 4 | 0.542 |
| 14 | 4 | 0.583 |
| 15 | 4 | 0.625 |
| 16 | 4 | 0.667 |
| 17 | 4 | 0.708 |
| 18 | 4 | 0.75 |
| 19 | 4 | 0.792 |
| 20 | 4 | 0.667 |
| 21 | 5 | 0.7 |
| 22 | 5 | 0.733 |
| 23 | 5 | 0.767 |
| 24 | 5 | 0.8 |
| 25 | 6 | 0.69 |
| 26 | 6 | 0.72 |
| 27 | 6 | 0.75 |
| 28 | 6 | 0.78 |
| 29 | 7 | 0.69 |
| 30 | 7 | 0.71 |
| 31 | 7 | 0.738 |
| 32 | 7 | 0.761 |
| 33 | 7 | 0.785 |
| 34 | 8 | 0.708 |

| 1 | 9 | 17 | 25 | 33 | |

IR 2

| 2 | 10 | 18 | 26 | 34 | |

IR 3

| 3 | 11 | 19 | 27 | |

IR 4

| 4 | 12 | 20 | 28 | |

IR 5

| 5 | 13 | 21 | 29 | |

IR 6

| 6 | 14 | 22 | 30 | |

IR 7

| 7 | 15 | 23 | 31 | |

IR 8

| 8 | 16 | 24 | 32 | |

IR 9

| | | | | | |

Initial IR Basis.: 4
Target Utilization Ratio: 0.8

New IR for $n^{th}$ used RAU

☐ Unused RAU  |n| Used RAU

| Used RAU | Used IR | Utilization Ratio |
|---|---|---|
| 1 | 8 | 0.708 |
| 2 | 8 | 0.708 |
| 3 | 8 | 0.708 |
| 4 | 8 | 0.708 |
| 5 | 8 | 0.708 |
| 6 | 8 | 0.708 |
| 7 | 8 | 0.708 |
| 8 | 8 | 0.708 |
| 9 | 8 | 0.708 |
| 10 | 8 | 0.708 |
| 11 | 8 | 0.708 |
| 12 | 8 | 0.708 |
| 13 | 8 | 0.708 |
| 14 | 8 | 0.708 |
| 15 | 8 | 0.708 |
| 16 | 8 | 0.708 |
| 17 | 8 | 0.708 |
| 18 | 8 | 0.708 |
| 19 | 8 | 0.708 |
| 20 | 8 | 0.708 |
| 21 | 8 | 0.708 |
| 22 | 8 | 0.708 |
| 23 | 8 | 0.708 |
| 24 | 8 | 0.708 |
| 25 | 8 | 0.708 |
| 26 | 8 | 0.708 |
| 27 | 8 | 0.708 |
| 28 | 8 | 0.708 |
| 29 | 8 | 0.708 |
| 30 | 8 | 0.708 |
| 31 | 8 | 0.708 |
| 32 | 8 | 0.708 |
| 33 | 8 | 0.708 |
| 34 | 8 | 0.708 |

# RESOURCE ALLOCATION TO REDUCE CORRELATED FAILURES

CROSS REFERENCE TO RELATED APPLICATIONS

This application is a continuation of U.S. patent application Ser. No. 13/243,858, filed Sep. 23, 2011, entitled "RESOURCE ALLOCATION TO REDUCE CORRELATED FAILURES," the disclosure of which is hereby incorporated herein in its entirety. This application also incorporates by reference for all purposes the full disclosure of U.S. patent application Ser. No. 12/894,883, entitled "VIRTUAL RESOURCE COST TRACKING WITH DEDICATED IMPLEMENTATION RESOURCES," filed on Sep. 30, 2010 and U.S. patent application Ser. No. 13/045,200, entitled "STATISTICALLY COST-FOLLOWING ACCOUNTING MODEL FOR DEDICATED RESOURCES," filed Mar. 10, 2011.

BACKGROUND

Modern systems often require numerous computing resources. An organization may, for example, utilize numerous servers, data stores, and other resources in its operations. An organization using computing resources to provide a service, perhaps through a website, for example, may configure its systems with redundancy to decrease the likelihood of the service becoming unavailable due to a failure of one or more of the computing resources. Multiple servers may be redundantly configured such that, if one or more servers stop functioning, the remaining servers will be available. Generally, organizations may utilize multiple computing resources, whether redundantly or not, in their operations.

In many instances, computing resources of an organization share some sort of other resource. A single host may implement multiple virtual machines. A rack-mount may hold multiple hosts, multiple storage devices, and/or multiple other devices. A power source may provide power to multiple racks. Sharing resources often provides various advantages including increased simplicity, increased efficiency, and other advantages. Sharing resources, however, can also have disadvantages. If a resource becomes unavailable, those sharing the resource may be adversely affected. For example, if a host loses power, malfunctions, or otherwise stops working, virtual machines implemented by the host may collectively stop functioning as a result. In other words, when a resource is shared, the possibility of correlated failure becomes an issue.

BRIEF DESCRIPTION OF THE DRAWINGS

Various embodiments in accordance with the present disclosure will be described with reference to the drawings, in which:

FIG. 3 is a diagrammatic representation of capacity of an implementation resource in accordance with at least one embodiment;

FIG. 7 is a diagrammatic illustration of implementation resources for which capacity has been allocated in accordance with at least one embodiment.

DETAILED DESCRIPTION

Figure 1:
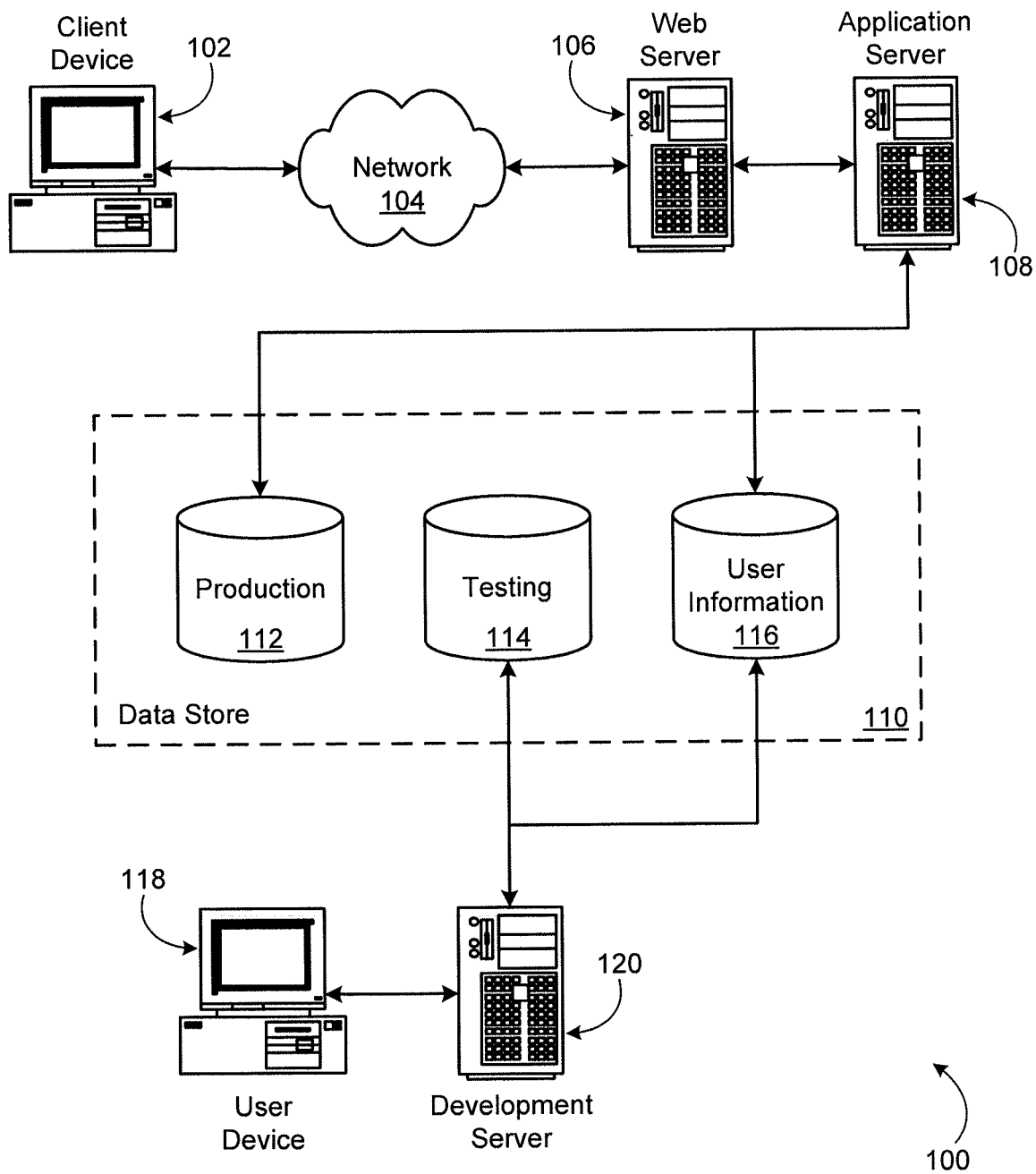
FIG. 1 is a schematic diagram illustrating an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In at least one embodiment, computing resources may be provisioned in a manner that is aware of, and respects, underlying implementation resource boundaries. A virtual resource provider, for example, may provision each of a variety of types of virtual resource (e.g., virtual computer systems, virtual data stores, virtual network connections) with a particular set of implementation resources (e.g., data center space, physical server computers, networking hardware). At least some of the implementation resources may be capable of participating in the implementation of multiple virtual resource instances, each potentially associated with a different customer of the virtual resource provider. In at least one embodiment, a set of customers (i.e., one or more customers) of the virtual resource provider may specify that particular virtual resources are to be implemented with implementation resources that are dedicated to the set of customers (i.e., implemented with "dedicated implementation resources"), and/or that particular implementation resources utilized to implement virtual resources of the set of customers are to be dedicated implementation resources. In other words, each customer of a set of customers may specify that implementation resources used to implement the customer's virtual resources are to be used exclusively for the customer's virtual resources and that unused capacity, if any, of any dedicated implementation resource is not to be used for virtual resources of another customer.

Implementation resource boundaries (e.g., physical separation boundaries) may correspond to information barriers (e.g., barriers to unintended information transfer and/or unauthorized data modification). Accordingly, dedicating an implementation resource to a particular set of customers of a virtual resource provider (thereby excluding other customers from the implementation resource) may establish one or more information barriers between the particular set of customers and other customers of the virtual resource provider (i.e., may place the particular set of customers "behind" the one or more information barriers). Alternatively, or in addition, dedication of implementation resources can improve virtual resource performance, for example, at least in part by reducing unanticipated implementation resource contention. As a further alternative, or further in addition, dedication of implementation resources can improve virtual resource fault tolerance, for example, by isolating virtual resources from operation faults that occur at other implementation resources.

In at least one embodiment, implementation resources are apportionable among a plurality of resource allocation units. For example, an implementation resource may have capacity for supporting a number of other resources, where each of the other resources corresponds to a number of resource allocation units. Virtual resources, for instance, may correspond to a number of resource allocation units of an implementation resource. A hardware server (physical host), for example, may be able to maintain a number of standard virtual computer systems offered by a virtual resource provider. Each standard virtual computer system may correspond to a resource allocation unit of the server. Some virtual resources may correspond to a number of resource allocation units greater than one, such as multiple resource allocation units. For example, a virtual computer system having, in one or more respects, increased performance over a standard virtual computer system, may correspond to multiple resource allocation units due to the increased hardware capacity necessary for operating the virtual computer system with higher performance. When using dedicated implementation resources, a customer may use less than all of the resource allocation units dedicated to the customer.

Efficient use of dedicated implementation resources often involves utilizing as much as possible or even all capacity of the resources for a single purpose, such as for a single customer of a virtual resource provider. However, such efficient use can increase the chance of correlated failures where the failure of an implementation resource causes the failure of multiple resources implemented by the implementation resource. A hardware server, for example, that implements multiple virtual computer systems for a single entity can fail and cause simultaneous failure of the multiple virtual computer systems. In an embodiment, capacity of implementation resources is allocated in a manner that reduces at least one aspect of coordinated failures. With respect to virtual computing resources, resources that are set up (e.g., provisioned) close in time are more likely to be related to a single purpose than resources that are set up further apart in time. A customer of a virtual resource provider may, for example, decide to add a service and, in furtherance of this goal, order from the virtual resource provider computing resources for the service. The newly ordered computing resources are more likely to be related to one another than to other computing resources of the customer that were ordered a significant amount of time in the past. In addition, entities often set up virtual resources in a systematic manner where resources related to a single purpose (to support a website, e.g.) are set up at a different time than virtual resources for another purpose.

In an embodiment, correlated failures are reduced by intelligent allocation of implementation resource capacity. In particular, capacity of one or more implementation resources dedicated to a particular purpose (e.g. to a particular customer) is allocated in a manner that distributes resources such that, resources that are requested to be provisioned closer in time are less likely to be provisioned using the same implementation resource. For example, if a customer of a virtual resource provider, over a time period, orders a number of virtual computer systems, the successively ordered virtual computer systems may be implemented by different hardware devices.

In addition, capacity of dedicated implementation resources, in an embodiment, is allocated in a manner that satisfies one or more conditions for a fleet of resources. One condition may be that an initial number of resources (e.g. virtual resources) are implemented by the same number of implementation resources. For instance, the first n virtual computer systems of a customer may be required to be implemented by n hardware servers. In this manner, resources are initially implemented using capacity that is obtained from implementation resources in a distributed manner, thereby reducing the likelihood that resources intended for a common purpose may fail together.

Other conditions that may be followed during the implementation of resources using a fleet of dedicated implementation resources relate to utilization of the capacity of the fleet as a whole. In an embodiment, resources are implemented in a manner that ensures that a certain percentage of the fleet's capacity that is used to implement resources is not exceeded. The usage of the capacity of the fleet may be measured by a utilization ratio which may be the amount of capacity that is used to implement resources divided by the amount of capacity of the fleet as a whole. In embodiments measuring fleet capacity in terms of resource allocation units, the utilization ratio may be the number of resource allocation units that have been allocated divided by the total number of resource allocation units for the fleet as a whole. As an illustrative example, if a fleet of dedicated hardware servers is able to support n virtual computer systems, but only m (less than n) virtual computer systems have been provisioned, the utilization ratio may be m divided by m. To allocate capacity in this manner, in an embodiment, existing dedicated capacity is utilized to implement requested resources until the use of the existing dedicated capacity would cause the utilization ratio to exceed a particular value. When use of the existing dedicated capacity to implement an additional resource would cause the utilization ratio to exceed the particular value, in an embodiment, another implementation resource is added to the fleet, thereby ensuring that the utilization ratio remains below the particular value.

Variations of the above are also considered as being within the scope of the present disclosure. For example, allocation of dedicated resources according to one or more of the above conditions (or any conditions which may be enforced) may be ensured for a logical grouping of resources. The logical grouping may be user specified, such as by a customer of a virtual resource provider through an application programming interface (API) of the virtual resource provider. The customer may, for instance, group some of its resources for one purpose (e.g. external facing web site) and group some of the other resources for another purpose (e.g., a network of resources used for internal purposes). When the customer requests resources for a particular group to be provisioned, one or more conditions on allocation of resources may be enforced for the resources in the group, without taking into account how resources are allocated for one or more other groups. Other variations are considered as being within the scope of the present disclosure, including, but not limited to, additional variations discussed below.

Various approaches may be implemented in various environments for various applications. For example, FIG. 1 illustrates aspects of an example environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
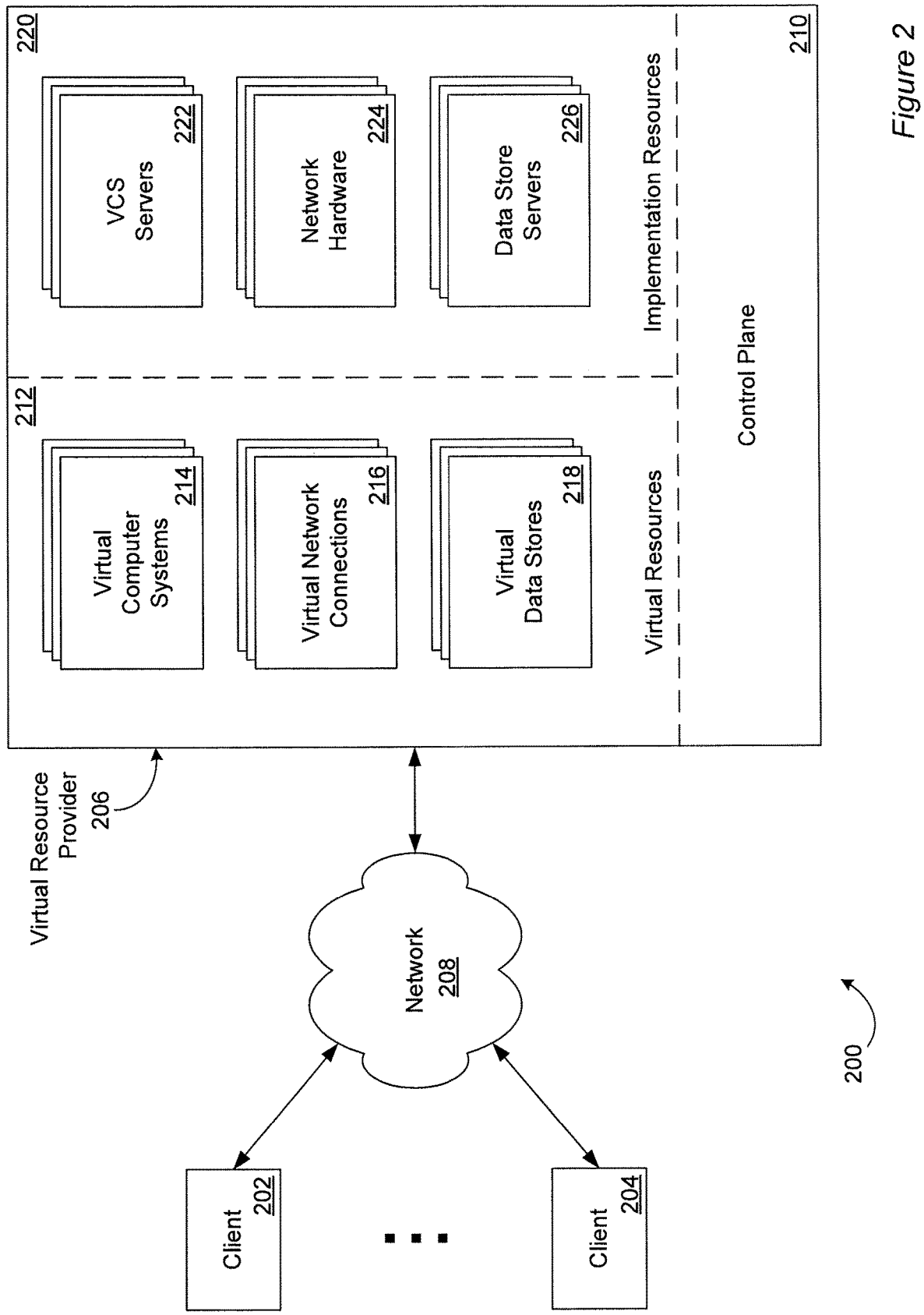
FIG. 2 is a schematic diagram depicting aspects of an example virtual resource provisioning architecture in accordance with at least one embodiment.

In at least one embodiment, one or more aspects of the environment 100 may incorporate and/or be incorporated into a virtual resource provisioning architecture. FIG. 2 depicts aspects of an example virtual resource provisioning architecture 200 in accordance with at least one embodiment. The example virtual resource provisioning architecture 200 includes multiple clients 202-204 communicatively connected to a virtual resource provider 206 over a network 208. For example, the clients 202-204 may corresponding to computing devices such as the computing device 102 of FIG. 1 and/or client programs incorporated into such computing devices. The ellipsis between the client 202 and the client 204 indicates that the virtual resource provisioning architecture 200 may include any suitable number of clients (e.g., thousands, millions, and more) although, for clarity, only two are shown in FIG. 2.

One or more of the clients 202-204 may be utilized by one or more customers of the virtual resource provider 206 to interact with a control plane 210 of the virtual resource provider 206, and thereby provision one or more virtual resources 212. Alternatively, or in addition, one or more of the clients 202-204 may be utilized (not necessarily by virtual resource provider 206 customers) to interact with provisioned virtual resources 212. The provisioned virtual resources 212 may include any suitable virtual resources. Examples of suitable virtual resources 212 include virtual computer systems 214, virtual network connections 216, and virtual data stores 218, as well as virtual resources not shown in FIG. 2 such as specialized data processing agents, media streaming agents including audio and video streaming agents, message queues, publish-subscribe topics configured to notify subscribers having subscriptions that match events published to the publish-subscribe topics, monitoring agents, load balancing agents, and suitable combinations thereof.

The virtual resource provider 206 may include any suitable implementation resources 220. Each of the virtual resources 212 may be implemented by a set of the implementation resources 220. In at least one embodiment, various implementation resources of the implementation resources 220 may be configured to participate in implementing, at least in part, multiple virtual resources of the virtual resources 212. Examples of suitable implementation resources 220 include virtual computer system (VCS) servers 222, network hardware 224, and data store servers 226, as well as implementation resources not shown in FIG. 2 and/or those described in more detail below with reference to FIG. 3, FIG. 4, FIG. 5 and FIG. 6. The control plane 210 may process virtual resource provisioning requests, manage allocation of virtual resources 212 to implementation resources 220 and/or manage allocation of implementation resources 220 to virtual resources 212, as well as provide for associated cost accounting services.

When a particular implementation resource of the implementation resources 220 participates in the implementation of multiple virtual resources of the virtual resources 212, the implementation resource may become contended, for example, the implementation resource may receive sufficient service requests from the multiple virtual resources that request servicing time increases. Contended implementation resources can be a source of unintended and/or unauthorized information transfer between virtual resources, for example, based at least in part on variation in request servicing time. In at least one embodiment, a set of customers may establish a barrier to such information transfer to other customers of the virtual resource provider 206 at least in part by requesting that virtual resources associated with the set of customers be provisioned with dedicated implementation resources. Such barriers may lower a probability that one or more of the other customers of the virtual resource provider gains unauthorized read and/or write access to information (including unpublished information) concerning the virtual resources of the set of customers. Implementation resource dedication boundaries, defining implementation resource dedication units, may correspond to boundaries between physical and/or hardware components including boundaries due to physical barriers and/or physical separations, as well as to hard (e.g., hardware enforced) scheduling and/or timing boundaries, and suitable combinations thereof.

As discussed above, embodiments of the present disclosure are applicable to apportionable implementation resources. FIG. 3, accordingly, provides a diagrammatic representation of an implementation resource that is apportionable to a plurality of resource allocation units (RAUs, as illustrated in FIG. 3 and later figures). In an embodiment, implementation resource is a physical host and the resource allocation units are virtual computer systems implemented by the host. For example, the physical host may utilize a hypervisor that manages one or more guest operating systems for one or more corresponding virtual computer systems. As noted above, however, the implementation resource may be one of many different types of implementation resources that are apportionable to a plurality of resource allocation units, which may be computing resources that are different from virtual computer systems. As just one example, the implementation resource may be a rack mount and the computing resources may be hardware devices that are mounted in the rack mount and/or mountable in the rack mount. As another example, an implementation resource may be a physical storage device, such as a hard drive, and the resource allocation units may be virtual data stores implemented by the hard drive. As yet another example, the implementation resource may be a backup power generator and the resource allocation units may be devices that are powerable by the backup power generator. As noted, other types of implementation units and resource allocation units may also be apportioned according to the various embodiments of the present disclosure.

As shown in the illustrative example of FIG. 3, the implementation resource is apportionable to six resource allocation units. In the example of a physical host implementation resource that implements virtual computer systems, the physical host in FIG. 3 would be able to support six virtual computer systems of a standard type. It should be noted that a physical host implementing up to six virtual computer systems is meant to be illustrative, and other allocations are considered as being within the scope of the present disclosure. For instance, depending on hardware performance characteristics, the types of virtual computer systems, and other factors, a physical host may be able to implement more than or less than six virtual computer systems. Generally, the number of resource allocation units to which the implementation resource can be allocated may be set in various ways. In one embodiment, the number of virtual computer systems that may be implemented by a single physical host is limited by an owner/operator of the physical host for various reasons. A virtual resource provider or other operator of a physical host used for implementing virtual machines may limit the number of virtual computer systems implementable by the host even though the physical host may be physically capable of implementing more virtual computer systems. The virtual resource provider or other operator may, for instance, limit the number of virtual computer systems implemented by a host in order to maintain a certain level of performance by the virtual computer systems and to avoid poor performance due to simultaneous computing resource needs by the virtual computer systems.

The number of resource allocation units to which an implementation resource may be allocated may be set in other ways. For example, capabilities of the implementation resource may provide a natural limit to the number of resource allocation units. Output capabilities of a generator, for instance, may limit the number of devices that can draw power from the generator. As another example, a physical storage device is limited by how much total data the device can store. A one-terabyte physical storage device, for example, may be physically limited to implementing ten one-hundred-gigabyte virtual storage devices.

As discussed above, a resource allocation unit may be a standard measure of a computing or other resource, such as a standard virtual computer system. However, actual resources to which an implementation resource is apportioned may themselves correspond to numbers of resource allocation units other than one. As noted, for example, a virtual resource provider may allow customers to order virtual computer systems that require fewer resources than a standard virtual computer system corresponding to a resource allocation unit. Similarly, some customers may be provided the ability to order virtual computer systems that require more resources than a standard virtual computer system corresponding to a resource allocation unit. Generally, an implementation resource may be apportioned to various units where some or all of the units do not correspond to a single resource allocation unit.

Figure 4:
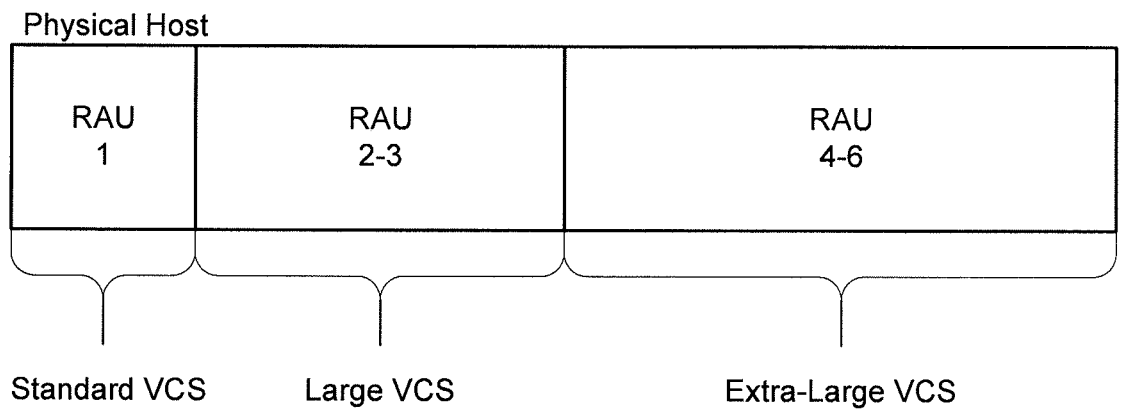
FIG. 4 is another diagrammatic representation of capacity of an implementation resource in accordance with at least one embodiment.

FIG. 4, for example, shows an illustrative example of a resource allocation unit that is apportioned to units having corresponding varying numbers of resource allocation units. For the purpose of illustration, the implementation resource of FIG. 4 is depicted and described in terms of a physical host implementing virtual computer systems. However, as noted, the implementation resource and the units to which the implementation resource is apportioned may be of different types. In FIG. 4, a physical host is apportioned to three virtual computer systems (VCSs, in the figure). In FIG. 4, however, each of the virtual computer systems differ from one another in the resources of the host needed. For example, as illustrated, the physical host implements a standard virtual computer system corresponding to a single resource allocation unit.

Another virtual computer system, termed a "Large VCS" in the figure, corresponds to two resource allocation units of the physical host. Computing resources of the physical host may be dedicated to the virtual computer systems implemented by the physical host according to the number of resource allocation units to which each virtual computer system corresponds. As an illustrative example, a standard virtual computer system may be allocated two gigabytes of memory, a virtual core, and one-hundred gigabytes of storage while the Large VCS may be allocated four gigabytes of memory, two virtual cores, and two-hundred gigabytes of storage. It should be noted, however, that the ratios of the resources of the physical host allocated to each virtual computer system need not correspond exactly to the number of resource allocation units of the virtual computer system. For example, the Large VCS need not be allocated exactly twice as much memory and storage as the standard virtual computer system, but can be allocated more or less of each.

Also shown in FIG. 4 is a virtual computer system titled an "Extra-Large VCS" which corresponds to three resource allocation units. The amount of resources of the physical host dedicated to the Extra-Large VCS may be approximately three times that of the standard virtual computer system. In this manner, the resources of the physical host are apportioned among three virtual computer systems, where each virtual computer system requires a different amount of resources of the physical host. This allows use of the physical host in a manner that provides performance of the virtual computer systems consistent with expectations of customers or other users of the virtual computer systems.

Variations are also considered as being within the scope of the present disclosure. For example, FIG. 4 shows all virtual computer systems having a corresponding integer number of resource allocation units. Some virtual computer systems may have non-integer-corresponding numbers of resource allocation units. There may be, for instance, a mini-virtual computer system that corresponds to one-half of a resource allocation unit. There may also be virtual computer systems corresponding to non-integer numbers of resource allocation units that are greater than one, such as one and a half.

In addition, FIGS. 3 and 4 show an implementation resource having a number of resource allocation units that are apportionable to various units that utilize the resources of the implementation resource. In this manner, FIGS. 3 and 4 show a one-dimensional relationship between an implementation resource and resource allocation units. Multi-dimensional variations are also within the scope of the present disclosure. A physical host, for example, may include numerous types of apportionable resources such as processing resources, storage resources, and memory resources. Each apportionable resource of an implementation resource may be apportioned to one or more resource using units (e.g., virtual computer systems). A standard virtual computer system may, for instance, correspond to a single processing resource allocation unit, a single memory resource allocation unit, and a single storage resource allocation unit. Any particular virtual computer system may correspond to different amounts of each resource allocation unit. A virtual computer system that is needed for computationally intensive tasks, but that does not require a lot of storage may, for example, correspond to two processing resource allocation units, one and a half memory resource allocation units, and one storage resource allocation unit. A virtual computer system that is needed for tasks not requiring a high level of computational intensity may, as an example, correspond to one half of a processing resource allocation unit, one memory resource allocation unit, and two storage resource allocation units. Each unit, (e.g., virtual computer system) to which n apportionable resources (n being an integer) of an implementation resource correspond may, therefore, itself correspond to an n-dimensional vector where each entry in the vector corresponds to an amount of capacity of a corresponding resource. Further, some apportionable resources of an implementation resource may be grouped such that, if an implementation resource includes n apportionable resources, each unit to which the resources are apportionable may correspond to an m-dimensional vector where m is an integer less than n.

With implementation resources having capacity corresponding to multiple dimensions of the capacity, the implementation resources may be able to implement resources that, collectively considered, correspond to a number of resource allocation units for each dimension that is less than or equal to that determined by the capacity of the implementation resource. For instance, a physical host implementing a number of virtual computer systems may be able to implement an additional virtual computer system for some types of virtual computer systems but not for others. The physical host may, for instance, be able to implement an additional virtual machine with up to a certain amount of memory and/or storage, but may be able to implement any number of virtual cores (for those numbers of virtual cores that are actually available for virtual computer systems.)

As discussed, implementation resources may be dedicated in various ways. For example, an implementation resource of a virtual resource provider may dedicate a physical hardware resource to a single customer such that the physical hardware resource is prevented from being used to support another customer. A physical host, for instance, may be used solely to implement one or more virtual computer systems for a customer, but not for any other customers. When implementation resources of a virtual resource provider are not dedicated, the virtual resource provider may implement resources of multiple customers with an implementation resource. If, for example, a customer orders a single virtual computer system and a physical host is able to implement six standard virtual computer systems, the host that is used to implement the customer's virtual computer system may also be used to implement up to five other virtual computer systems for one or more other customers. In this manner, the virtual resource provider is able to efficiently utilize its fleet of implementation resources.

Efficient utilization of dedicated implementation resources, however, often results in implementation of customer resources by a smaller set of implementation resources than would be used had the implementation resources not been dedicated. With undedicated resources of a virtual resource provider, for example, a customer with five virtual computer systems may have the virtual computer systems implemented by multiple, perhaps five, physical hosts. If one of the physical hosts fails, the customer may be left with numerous functional virtual computer systems until the problem with the failed host is resolved. With the same example where the virtual computer systems are dedicated (i.e. implemented by implementation resources dedicated to the customer), however, it is typically most efficient to use a single physical host to implement the five virtual computer systems. If the host fails, then all of the virtual computer systems may fail at once, leaving the customer with no functional virtual computer systems until the problem is resolved. Generally, the use of dedicated implementation resources may result in correlated failures for the resources implemented by the dedicated implementation resources.

Figure 5:
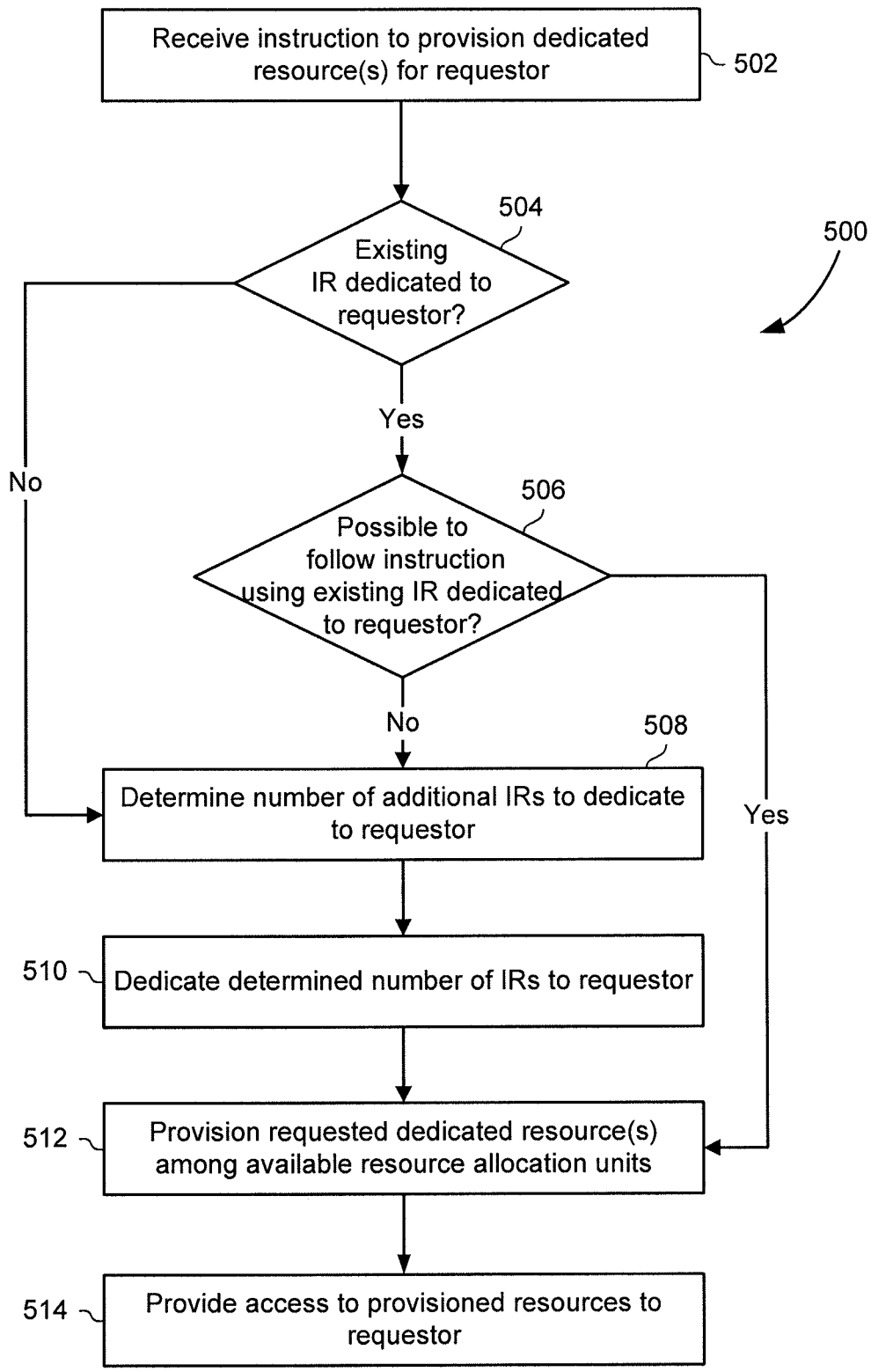
FIG. 5 illustrates a flowchart for an example process of a process for allocating capacity of a dedicated implementation resource in accordance with at least one embodiment.

Accordingly, FIG. 5 shows an illustrative example of a process 500 that may be used to apportion one or more resources of one or more implementation resources in a manner that reduces correlated failures, in accordance with an embodiment. Some or all of the process 500 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory. The one or more computer systems may be, as an example, one or more computer systems that collectively implement the control plane 210 described above in connection with FIG. 2.

In an embodiment, the process includes receiving 502 an instruction to provision one or more dedicated resources for a requestor. In an embodiment, the dedicated resources are virtual computer systems to be provisioned using one or more physical hosts that are dedicated to the requestor, that is, one or more physical hosts that are prevented from being used to implement virtual computer systems or other computing resources for entities other than the requestor. The requestor, in an embodiment, is a customer of a virtual resource provider whose computer system(s) performs the process 500. However, as noted elsewhere herein, the dedicated resources and the requestor may be different than described for the purpose of illustration in connection with FIG. 5.

As illustrated in FIG. 5, the process 500 may include determining 504 whether there are existing implementation resources dedicated to the requestor. The requestor may, for example, be a customer of a virtual resource provider that has an established fleet of computing resources with the virtual resource provider where some of the fleet is dedicated to the requestor. In this instance, the determination would be positive. Similarly, the requestor may be a customer of the virtual resource provider that has not established a fleet of computing resources with the virtual resource provider and/or that has not established any dedicated resources with the virtual resource provider. In this instance, the determination would be negative.

In an embodiment, if it is determined that there are existing implementation resources dedicated to the requestor, a determination is made whether it is possible to follow the instruction using the existing implementation resource(s) that are dedicated to the requestor 506. As discussed above, an implementation resource may have capacity corresponding to a number of resource allocation units. If the capacity of the implementation resources is not fully utilized, it may be possible to implement additional resources using the implementation resource. For example, if a physical host dedicated to the requestor has capacity to implement eight standard virtual computer systems, but is currently only implementing three standard virtual computer systems, the physical host would be able to implement up to five additional standard virtual computer systems. Therefore, determining whether it is possible to follow the instruction using existing implementation resources dedicated to the requestor may be made by calculating the available capacity (possibly in terms of resource allocation units) and determining whether the available capacity is sufficient for following the instruction.

A determination whether it is possible to fulfill the request using existing implementation resources dedicated to the requestor may also be based at least in part on one or more criteria. As one example, in an embodiment, dedicated resources are provisioned to fulfill the requirement that the first n resources are each implemented using a separate implementation resource, for some integer n. For example, with respect to the example of physical hosts and dedicated virtual computer systems, the requirement may be that the first five virtual computer systems of the customer be implemented using five separate physical hosts. In this manner, by using different physical hosts for each of the first five virtual computer systems, it is less likely that all five virtual computer systems will all fail together. As another example of a criterion, a requirement may be that a target utilization ratio for a fleet of implementation resources dedicated to the requestor not be exceeded. A utilization ratio for the fleet may be based at least in part on the number of resource allocation units available for the fleet divided by the number of resource allocation units actually used by the fleet. For example, with a fleet of five physical hosts that can each implement up to six standard virtual computer systems, if the fleet actually implements ten virtual computer systems, the utilization ratio may be 0.3333 since ten out of a possible of thirty virtual computer systems are implemented by the five physical hosts.

A target utilization ratio may be a utilization ratio that should not be exceeded. The target utilization ratio may be a constant set for policy reasons, may be a variable that is based at least in part on the number of resource allocation units used, or may be set in other ways. For instance, customers of a virtual resource provider may select a target utilization ratio for dedicated resources provided by the virtual resource provider. The customers may pay more for lower target utilization ratios than for higher target utilization ratios, since lower target utilization ratios result in less efficient use of the fleet and, therefore, a loss of opportunity to the virtual resource provider to utilize capacity and derive revenue accordingly. The virtual resource provider may also set different target utilization ratios for different customers, for example, to ensure better performance to select customers by providing a lower target utilization ratio.

Figure 6:
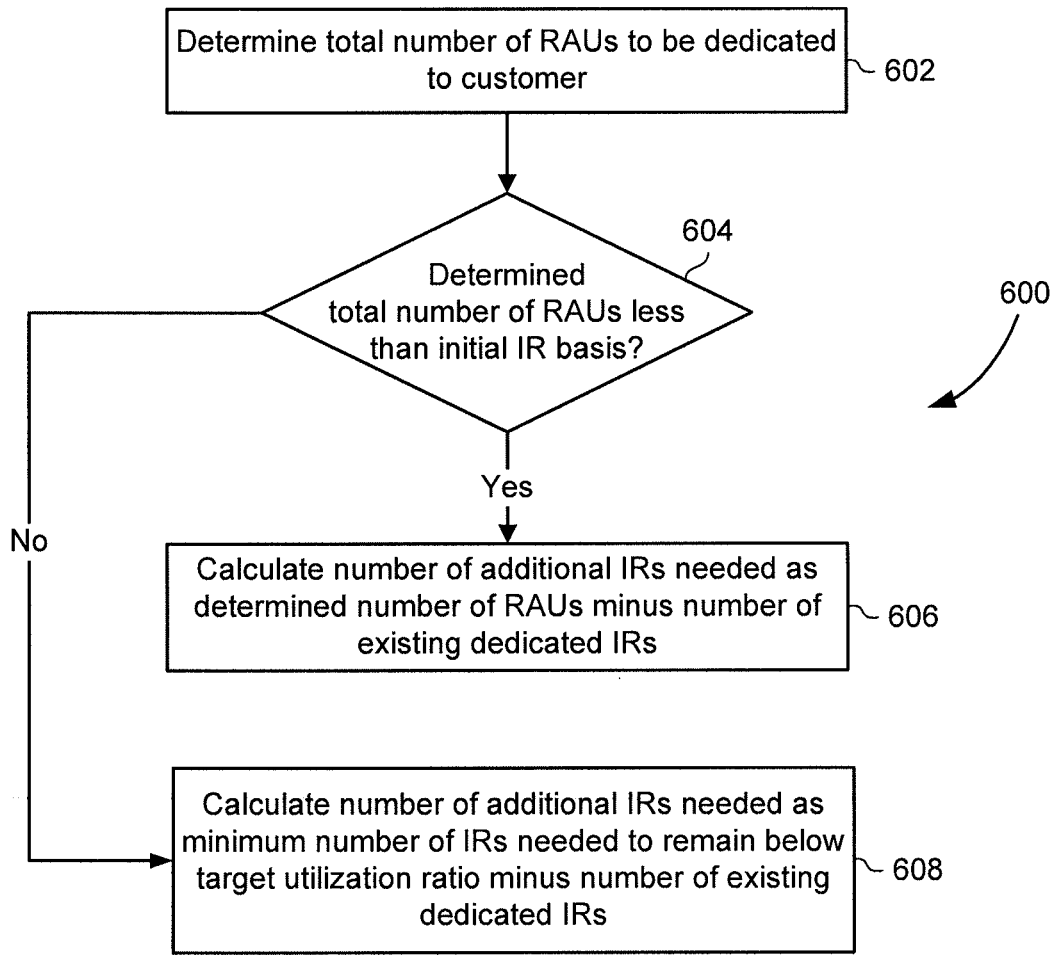
FIG. 6 illustrates a flowchart for an example process of a process for determining a number of implementation resources needed in accordance with at least one embodiment.

In an embodiment, if it is determined that there are no existing implementation resources dedicated to the requestor and/or if it is determined that it is not possible to follow the instruction using the existing implementation resources dedicated to the requestor, a number of additional implementation resources needed to dedicate to the requestor to follow the instruction is determined 508. FIG. 6, described below, shows an illustrative example of a process for determining how many additional implementation resources to dedicate, although any process may be used. Upon determining a number of additional implementation resources to dedicate to the requestor, the determined number of implementation resources are dedicated to the requestor 510. Dedicating the implementation resources to the requestor may include taking one or more actions that prevent the implementation resources from being used to implement resources for others. For example, an administrative data store may be updated to reflect the particular implementation resources have been dedicated to the requestor so that, when additional implementation resources are needed for other purposes, the dedicated implementation resources may be avoided accordingly.

Upon dedicating the determined number of implementation resources to the requestor, dedicated resources may be provisioned 512 using the implementation resources according to the instruction. For example, one or more physical hosts may be used to provision a number of virtual computer systems specified by the instruction. Generally, provisioning the resources using the implementation resources may be performed in any suitable manner which may depend on the type of implementation resources and resources being implemented. Once the resources have been provisioned using the implementation resources, access to the provisioned resources may be provided 514. Access to the provisioned resources may be provided in any suitable manner. For example, if the provisioned resources are virtual computer systems provisioned with one or more physical hosts, the requestor may be provided the ability to programmatically manage the virtual computer systems, such as by configuring them to perform one or more functions.

As noted above, FIG. 6 shows an illustrative example of a process 600 that may be used to calculate how many implementation resources are needed to follow an instruction to provision one or more dedicated resources. The process 600, in an embodiment, includes determining 602 a total number of resource allocation units to be dedicated to the customer. The total number of resource allocation units may be the number of resource allocation units already dedicated to the customer plus the number of resource allocation units needed, for example, to follow an instruction to provision one or more resource allocation units as in FIG. 5. In an embodiment, a determination is made whether the determined total number of resource allocation units is less than an initial implementation resource basis number 604. The initial implementation resource basis number may be a number used to specify how many resource allocation units must be used in a dedicated manner before two resources can be implemented by the same implementation resource. As an illustrative example, if the initial implementation resource basis number is four, then four different implementation units may be required to implement the first four resources before resources can share the same implementation resource. For instance, if the implementation resources are physical hosts and the resources being implemented are virtual computer systems, four physical hosts may be required to implement the first four virtual computer systems (which may each correspond to a resource allocation unit, or more than or less than a resource allocation unit). The fifth resource may be implemented by one of the four implementation resources, subject to one or more other conditions, such as conditions on a target utilization ratio.

If it is determined that the total number of resource allocation units is less than the initial implementation resource basis number, then the number of additional implementation resources needed may be calculated as the determined number of resource allocation units minus the number of existing dedicated implementation resources 606. Continuing the example of physical hosts and virtual computer systems, with the initial implementation resource basis number being four, if each virtual computer system corresponds to a resource allocation unit, and if two physical hosts each already implement a corresponding virtual computer system, then the number of additional implementation resources needed would be one. If, however, it is determined that the total number of resource allocation units is not less than the initial implementation resource basis number, then the number of additional implementation resources needed may be calculated as the minimum number of implementation resources needed to remain below the target utilization ratio minus the number of existing dedicated implementation resources 608.

FIG. 7 shows an illustrative diagram that shows how resources may be implemented (e.g. provisioned) in accordance with the processes described above in connection with FIGS. 5 and 6. In particular, FIG. 7 shows how resources may be implemented using implementation resources. In FIG. 7, thirty-four resources, each corresponding to a single resource allocation unit (RAU, in the Figure), are implemented using apportionable implementation resources (IRs, in the Figure). In FIG. 7, each box of implementation resources corresponds to a resource allocation unit and, therefore, to a resource being implemented by the resource allocation unit. The number in each box may indicate the order in which the resource is processed and/or implemented (e.g. provisioned). For example, a customer of a virtual resource provider may sequentially submit thirty four orders for virtual computer systems, possibly over a period of time, which may be days, months, years, or other time periods. The numbering in the boxes may, therefore, indicate the ordering in which access to the provisioned virtual computer systems was provided to the customer. It should be noted, however, that the numbers need not correspond to an ordering of processing or provisioning. For example, the resources may be implemented in an order that does not correspond to the ordering in the figure as long as conditions with respect to the initial implementation resource basis and the target utilization ratio are satisfied. In addition, some or all resources may be provisioned simultaneously.

As shown in FIG. 4, the initial implementation resource basis number is four and the target utilization ratio is 0.8. Accordingly, the first four resources (marked as boxes 1 through 4) are provisioned using four separate implementation resources. The fifth resource is provisioned using one of the four implementation resources that were used to provision the first four resources. In this case, the fifth resource is provisioned using the first implementation resource, although it could have been implemented using one of the others. Resources are implemented among the first four implementation resources until the addition of a resource to one of the first four implementation resources would cause the utilization ratio to exceed 0.8. At this point, in this illustrative example, a fifth implementation resource is added to the fleet. In particular, addition of the twentieth resource to one of the first four implementation resources would cause the utilization ratio to exceed 0.8 and, therefore, a new implementation resource (IR 5, in the Figure) is added to the fleet.

This process continues and additional resources are implemented using available capacity of the currently dedicated implementation resources until the addition of a resource would cause the utilization ratio to exceed 0.8 and, therefore, a new implementation resource is added to the fleet. For example, the twenty-fifth resource is implemented with an additional implementation resource (IR 6) because adding it to the first five would have caused the utilization ratio to exceed 0.8. Similarly, the twenty-ninth and thirty-fourth resources are implemented each with new implementation resources (IR 7 and IR 8) to avoid causing the utilization ratio to exceed 0.8. A table to the right of the figure shows how many implementation resources are needed (middle column) to implement a number of resource allocation units (left column) to keep the utilization ratio below 0.8.

Figure 8:
FIG. 8 is another diagrammatic illustration of implementation resources for which capacity has been allocated in accordance with at least one embodiment.

As discussed, variations of the embodiments discussed herein are considered as being within the scope of the present disclosure. For example, resources may be implemented in various ways depending on a variety of circumstances. For example, with physical hosts and virtual computer systems managed by a virtual resource provider, customers may build a fleet in a variety of ways. Customers, for example, may order resources one at a time or may order multiple resources, perhaps enough for a complete fleet, at a time. The allocation of capacity of implementation resources as illustrated in FIG. 7 may be pursuant to performance of the processes of FIGS. 5 and 6 when a customer orders resources one at a time, or when the customer builds its fleet with several orders of a number of resources. FIG. 8 shows an illustrative diagram that shows how allocation of implementation resource capacity may be performed when a customer makes an order for a fleet of dedicated resources at a time or when thirty multiple dedicated resources are otherwise requested in a short period of time. As with FIG. 7, in FIG. 8 thirty-four resources are implemented among eight implementation resources, where an initial implementation resource basis number is four and a target utilization ratio is 0.8. However, FIG. 8 shows a different allocation of capacity of implementation resources than in FIG. 7.

In particular, because it is known ahead of time in this example that thirty-four resource allocation units are needed, eight implementation resources may be dedicated initially and resources may be implemented in a manner that spreads the resources being implemented more evenly among the eight implementation resources. In this particular example, for instance, each implementation resource implements a single resource allocation (i.e. a resource implemented by the implementation unit that corresponds to a single resource allocation unit) unit before any of the implementation resources implement a second resource allocation unit. Similarly, each implementation resource implements two resource allocation units before any single implementation resource implements three. This process may continue, as illustrated in FIG. 8, until all of the thirty-four resources are implemented by an implementation resource. As illustrated by the table on the right of FIG. 8, because the allocation of the capacity of the implementation resources is calculated in advance, it is known ahead of time that the utilization ratio will be approximately 0.708, which would not have been possible with only seven implementation resources. FIGS. 7 and 8 also illustrate an implementation resource, labeled IR 9, that is shown without an indication of being used to implement any resources. The implementation resource IR 9 may be, for example, an implementation resource that is in a general pool of implementation resources. For example, IR 9 may be a physical host that is not currently used or that is used in a non-dedicated manner, that is, in a manner that allows implementation by multiple users and/or for multiple purposes. If the customer whose implemented resources are illustrated in FIG. 8, for example, requests additional resources, and if fulfilling the request would cause the utilization ratio to exceed 0.8, IR 9 may be dedicated to the customer and used to implement one or more of the additional requested resources.

It should be noted that FIGS. 7 and 8 are illustrative in nature, and that variations are considered as being within the scope of the present disclosure. For example, FIGS. 7 and 8 show systematic approaches to allocating capacity of implementation resources. However, other approaches are also possible. For example, for each resource to be implemented, available capacity may be randomly chosen or chosen in a manner that is different from that which is illustrated. Also, as noted, resources may vary in the amount of capacity of an implementation resource required and, therefore, any resource to which capacity of an implementation resource is allocated may correspond to more than or less than a resource allocation unit. For instance, referring to FIG. 8, the first and second resource allocation units may correspond to a single resource (such as a high-performing virtual computer system) and, therefore, be implemented by the same implementation resource (e.g., physical host) instead of by two implementation resources, as illustrated in the Figure. Generally, other allocations of dedicated capacity may be performed in a manner that reduces correlated failure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving a request to provision a plurality of virtual machines using a set of resource hosts, wherein individual resource hosts of the set of resource hosts have particular capacity for virtual machine launches;
    launching the plurality of virtual machines of the request on the set of resource hosts such that individual resource hosts launch a first virtual machine of the plurality of virtual machines of the request prior to any resource host in the set of resource hosts launching a second virtual machine of the plurality of virtual machines of the request;
    receiving one or more different requests indicating a sequence of a different plurality of virtual machines to be launched on the set of resource hosts;
    as a result of a determination that fulfilling the one or more different requests using the set of resource hosts would result in a portion of an overall capacity of the set of resource hosts exceeding a target utilization condition, causing the set of resource hosts to be modified at least in part by adding an additional resource host to the set of resource hosts;
    fulfilling the one or more different requests at least in part by launching a virtual machine of the sequence of the different plurality of virtual machines on the additional resource host and launching a next virtual machine of the sequence of the different plurality of virtual machines on one of the resource hosts in the set of resource hosts; and
    maintaining the set of resource hosts such that at least two resource hosts of the set of resource hosts have available capacity to launch an additional virtual machine.

2. The computer-implemented method of claim 1, wherein:
    fulfilling the one or more different requests includes launching an additional virtual machine of the different plurality of virtual machines on a different resource host of the set of resource hosts, wherein the next virtual machine of the different plurality of virtual machines follows the virtual machine of the different plurality of virtual machines in the sequence, and the additional virtual machine of the different plurality of virtual machines follows the next virtual machine in the sequence.

3. The computer-implemented method of claim 1, wherein the set of resource hosts is reserved for use by a single customer of a cloud provider network.

4. The computer-implemented method of claim 1, further comprising, prior to launching the plurality of virtual machines of the request, adding an amount of resource hosts to the set of resource hosts to implement the plurality of virtual machines of the request.

5. A system for allocating capacity of implementation resources, comprising:
    one or more processors; and
    memory including instructions executable by the one or more processors to cause the system to at least:
        maintain a pool of implementation resources by at least managing the pool of implementation resources in accordance with a particular purpose;
        use the pool of implementation resources to provision resources of a request such that a plurality of individual implementation resources of the pool of implementation resources provision a first resource of the request prior to any implementation resource of the pool of implementation resources provisioning a second resource of the request;
        receive one or more different requests indicating a sequence of additional resources to be provisioned, at least some of the different requests to provision the additional resources for a user-specified set of the pool of implementation resources, wherein individual resources in the user-specified set of implementation resources have particular capacity to provision at least one of the additional resources;
        as a result of a determination that fulfilling the different requests using the user-specified set of implementation resources would result in a portion of an overall capacity of the implementation resources exceeding a target utilization condition, modify the user-specified set of implementation resources at least in part by adding an additional implementation resource to the user-specified set of implementation resources;
        fulfill the one or more different requests at least in part by provisioning the additional resources such that a first resource of the sequence of the additional resources is provisioned on the additional resource in the modified user-specified set of implementation resources and a second resource of the sequence of the additional resources is provisioned on a different implementation resource of the modified user-specified set of implementation resources; and
        maintain the modified user-specified set of implementation resources such that at least two implementation resources in the user-specified set of implementation resources have particular capacity to provision at least an additional resource.

6. The system of claim 5, wherein the particular purpose is use of the user-specified set of the pool of implementation resources by a customer of a computing resource.

7. The system of claim 5, wherein:
    a third resource of the sequence of the additional resources is provisioned on the additional implementation resource; and
    the third resource is subsequent to the second resource in the sequence of the additional resources.

8. The system of claim 5, wherein the implementation resources are resource hosts and the resources are virtual computing resources.

9. The system of claim 5, wherein the instructions are further executable by the one or more processors to further cause the system to at least:
    add implementation resources to the pool of implementation resources as a result of a determination that a condition on an amount of members of the user-specified set of implementation resources has not been satisfied, wherein the condition is provided with the one or more requests.

10. One or more non-transitory computer-readable storage media having stored thereon instructions executable by one or more processors of a computer system that, as a result of being executed by the one or more processors, cause the computer system to at least:

maintain groups of implementation resources with particular capacity for resource provisioning;

provision a plurality of resources in a group of the groups of implementation resources such that at least two individual implementation resources in the group provision a first resource prior to any implementation resource in the group provisioning a second resource;

receive requests to provision a different plurality of resources by the group of implementation resources of the groups of implementation resources, wherein the different plurality of resources have a sequence;

as a result of a determination that fulfilling the requests using the group of implementation resources would result in a portion of an overall capacity of the group of implementation resources exceeding a target utilization condition, modify the group of implementation resources at least in part by adding an additional implementation resource to the group of implementation resources;

provision the different plurality of resources by the group of implementation resources at least in part by provisioning a first resource of the sequence by the additional implementation resource and provisioning a next resource of the sequence on one of the implementation resources in the set of implementation resources; and maintain the group of implementation resources such that at least two implementation resources in the group of implementation resources have available capacity to launch an additional resource.

11. The one or more non-transitory computer-readable storage media of claim 10, wherein the implementation resources are hardware devices, and wherein the one or more resources are virtual computer systems.

12. The one or more non-transitory computer-readable storage media of claim 10, wherein the one or more conditions include a minimum number of implementation resources of the group that must be used to implement user-requested resources before an individual implementation resource of the group implements multiple resources.

13. The one or more non-transitory computer-readable storage media of claim 10, wherein the group of implementation resources is dedicated to exclusive use by particular customers of a virtual resource provider.

14. The computer-implemented method of claim 1, wherein the set of resource hosts includes a plurality of types of apportionable resources.

15. The computer-implemented method of claim 1, wherein the resource hosts are hardware devices.

16. The computer-implemented method of claim 1, subsequent to the one or more different requests being fulfilled, adding a further additional resource host to the set of resource hosts.

* * * * *